United States Patent
Henriksson

[19]

[11] Patent Number: 5,898,749
[45] Date of Patent: Apr. 27, 1999

[54] STEAM BLOWING ASSEMBLY FOR NUCLEAR POWER PLANTS

[75] Inventor: Mats Henriksson, Gävle, Sweden

[73] Assignee: Vattenfall AB, Stockholm, Sweden

[21] Appl. No.: 09/101,725

[22] PCT Filed: Jan. 15, 1997

[86] PCT No.: PCT/SE97/00046

§ 371 Date: Jul. 16, 1998

§ 102(e) Date: Jul. 16, 1998

[87] PCT Pub. No.: WO97/28536

PCT Pub. Date: Aug. 7, 1997

[30] Foreign Application Priority Data

Feb. 2, 1996 [SE] Sweden .................................. 9600396

[51] Int. Cl.$^6$ .............................................. G21C 9/012
[52] U.S. Cl. ............................................................ 376/283
[58] Field of Search ........................... 376/283; 165/110, 165/111

[56] References Cited

U.S. PATENT DOCUMENTS

| 4,139,413 | 2/1979 | Simon et al. | 376/283 |
| 4,172,009 | 10/1979 | Simon et al. | 376/283 |
| 4,428,904 | 1/1984 | Kuhnel | 376/283 |

FOREIGN PATENT DOCUMENTS

| 2316832 | 10/1974 | Germany . |
| 2616830 | 8/1977 | Germany . |
| 2733042 | 2/1979 | Germany . |
| 419273 | 7/1981 | Sweden . |

Primary Examiner—Daniel D. Wasil
Attorney, Agent, or Firm—Young & Thompson

[57] ABSTRACT

The invention relates to a steam blowing tube for nuclear power plants of the kind which has a lower end immersed in a water pool, the purpose of tube being to permit, if required, the blow down of steam into the water of the pool with the purpose of condensing the same so as to counteract the build-up of damaging steam overpressure in the containment of the reactor. A number of through holes are recessed in the wall (11) of the individual blow down tube (10) which each one is delimited by upper and lower edges (13, 14) of which at least one constitutes part of a portion (15) bent in relation to the tube wall (14). The lower hole edge (14) forms a steam flow cutting edge which, when the steam rushes down through the tube, divides a part flow from the main steam flow and brings said part flow out into the surrounding water of the pool before the main flow reaches the bottom opening (12) of the tube.

20 Claims, 1 Drawing Sheet

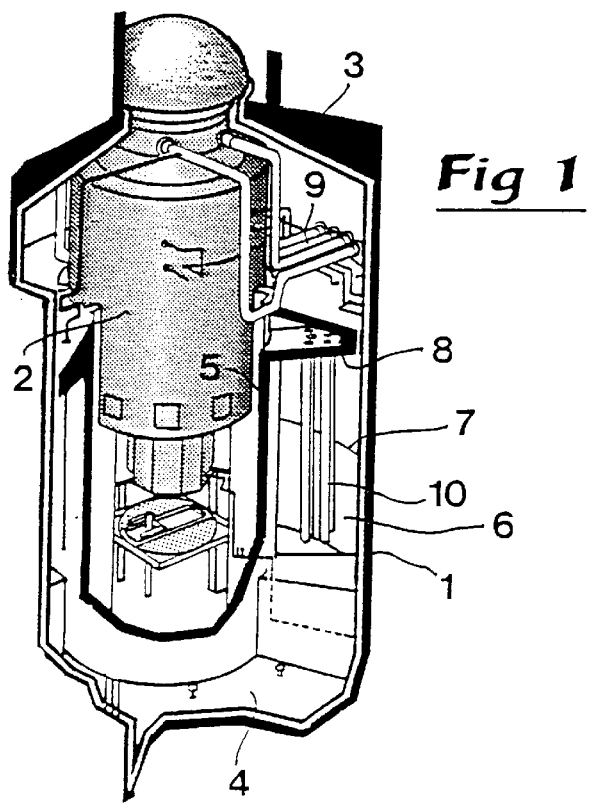
*Fig 1*
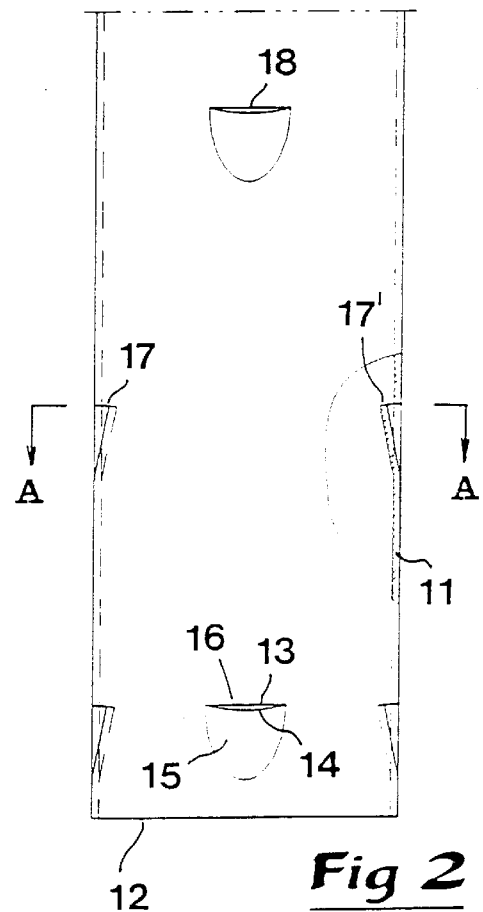
*Fig 2*
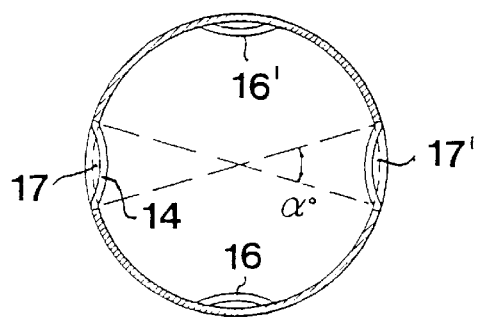
*Fig 3*
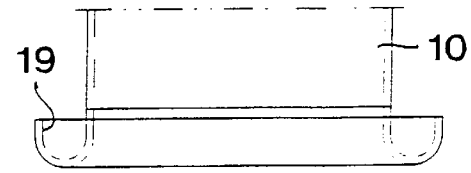
*Fig 4*
*Fig 5*

5,898,749

STEAM BLOWING ASSEMBLY FOR NUCLEAR POWER PLANTS

TECHNICAL FIELD OF THE INVENTION

This invention relates to a steam blowing assembly for nuclear power plants of the kind which comprises a plurality of tubes, open at the top and at the bottom, hanging in connection with a reactor, the lower ends of which tubes are immersed in a water pool and the purpose of which is to permit, if required, the blow down of steam into the water of the pool with the purpose of condensing the same so as to counteract the build-up of damaging steam overpressure in the containment of the reactor.

BACKGROUND OF THE INVENTION AND PRIOR ART

An assembly of the above-mentioned kind is schematically illustrated in FIG. 1, where 1 generally designates a containment for a nuclear power reactor 2. The containment has the shape of a cylindrical, often metal-lined concrete wall which is terminated at the top by a ceiling 3 and at the bottom by a bottom 4. An internal partition wall 5 near the reactor 2 delimits a ring-formed space, the bottom part of which forms a pool 6 for water. The water level is schematically indicated at 7. The internal partition wall 5 is terminated at the top by a circumfering ceiling part 8. In the space above said ceiling part 8, a plurality of line pipes 9 are mounted for feeding steam from the reactor 2, which in practice may consist of a boiling reactor.

In the event steam would leak out from the line pipes 9, e.g. as a consequence of unforeseen breakdowns, a particular steam blowing assembly is arranged in the containment, which assembly consists of a plurality of tubes 10, the upper and lower ends of which are open and which hang down from the ceiling part 8, more precisely immersed in the water of the pool 6. In practice, the water depth in the pool may attain 6–8 meters, the tubes 10 having a length of 12–15 meters so that the lower ends thereof are located close to the bottom of the pool. In practice, the number of tubes 10 in the assembly may amount to 30–90, each individual tube having a diameter of 50–60 cm.

In the event steam would come out in the top part of the containment, it may be blown down through the tubes 10 so as to be condensed as fast as possible in the water in the pool. Tests made have shown that steam which in this way rushes down through the individual tube under pressure applies considerable mechanical stresses to the tube as a consequence of explosion-like shocks arising when the steam leaves the lower opening of the tube, at the same time as the water in the pool rises or heaves. During a certain phase, steam may be brought out in the pool and to a certain extent condense therein, but also to a certain extent cause the water to rise, the water pressure in the bottom part of the pool increasing, more precisely to a level at which the water pressure increases above the steam pressure, water in a second phase beginning to rise up in the blow down tubes while lowering the water level in the pool. Then implosion-like shock phenomena arise in the area of the lower, open ends of the tubes. After this, the phases may vary in such a way that steam in one moment rushes down through the tubes and out in the pool water and pool water, in another moment, rises up in the tubes. By the fact that the blow down tubes are often fastened only at the upper ends thereof, more precisely in the ceiling part 8, the above-mentioned shock stresses on the lower, free-hanging ends of the tubes imply a security risk inasmuch as the tubes may be damaged or even come loose under extreme circumstances.

In order to counteract this risk, tests have been made to strap the lower parts of the tubes by means of wires and the like. However, wires which are mounted in the pool are exposed to very large stresses when the water heaves, and therefore this solution is not reliable. Furthermore, tests have been made to modify the shape of the lower ends of the blow down tubes so that shock phenomena are mitigated. Among other things, the lower end of the tube has been obliquely cut. Then, however, considerable transverse loads on the lower part of the tubes arise in connection with the shocks. Also, the lower end of the tube has been made with a cross-section-wise semi-circular corbelling around which the steam and the water respectively may move more smoothly than around a sharp tube wall edge. However, nor these tests have been successful, although a certain improving effect has been noted.

OBJECTS AND FEATURES OF THE INVENTION

The present invention aims at obviating the above-mentioned disadvantages of previously known steam blowing assemblies and at creating an improved assembly. Therefore, a primary object of the invention is to provide a blow down tube meant for such assemblies, in which shock phenomena are reduced in connection the feeding of steam down into the pool water as well as in connection with the rise of pressurized water into the tube. A further object is to attain the set object by means of, from a manufacturing point of view, technically simple and, accordingly, cheap means.

According to the invention, at least the primary object is attained by the features defined in the characterising clause of claim 1. Preferred embodiments of the invention are furthermore defined in the dependent claims.

BRIEF DESCRIPTION OF THE APPENDED DRAWING

In the drawing:

FIG. 1 is the above-mentioned perspective view which shows the general construction of a nuclear power plant of known type, FIG. 2 is an enlarged, partly cut view of the lower part of a blow down tube according to the invention, FIG. 3 is a perspective view showing the very lowest portion of the tube, FIG. 4 is a cross-section A—A in FIG. 2, and FIG. 5 is a detailed side view showing an alternative embodiment, known per se, of the bottom opening of the tube.

DETAILED DESCRIPTION OF A PREFERRED EMBODIMENT OF THE INVENTION

The blow down tube, designated 10 in its entirety according to FIG. 2, is in the form of a cylindrical plate wall 11, which at the bottom opens in a bottom opening 12. A number of through holes are recessed in the tube wall 11, each one of which being delimited by upper and lower edges 13 and 14 respectively. At least one of said edges is part of a portion bent in relation to the tube wall as a whole. In the shown example, each such bent portion 15 is formed in association with the lower hole edge 14 and extends inwards from the tube wall as such, as may be clearly seen in FIG. 3 and 4. In practice, the bent portion 15 may be made integrally with the tubewall as such, i.e. by plastic deformation thereof, though it is also conceivable to weld separate pieces of plate in openings in the tube wall.

In the shown, preferred embodiment, the proper hole is in the form of a slot inasmuch as said upper and lower edges 13, 14 are situated approximately in one and the same horizontal plane, i.e. without any marked level difference between the edges. In FIG. 4 is shown how the hole or the slot has an arc length along the tube wall corresponding to an arc angle α of approximately 30°. In practice, said arc angle should be within the range of 15–60°, suitably 30–45°.

According to the shown, preferred embodiment, the slot holes are arranged in several sets separated along the tube, each one of which comprising at least two, suitably identical holes which are mutually diametrically opposite. Thus, two pairs of lower slot holes 16, 16'; 16", 16" on a level below a second set of two holes 17, 17' are shown with a level difference corresponding to about the diameter of the tube. A third set of slot holes is shown at 18. The pairs of holes in adjacent sets of holes along the tube are advantageously rotationally displaced relative to each other, more precisely in a 90° angle in the example. In the shown preferred embodiment, the lowest set of holes comprises four equidistantly separated holes, while the sets of holes being above comprise only one pair of holes 17, 17'. The lowest set of holes is advantageously situated close to the bottom opening 12, e.g. at a distance corresponding to about half of the diameter of the tube.

When a set of holes comprises four holes, said holes may be rotationally displaced in a 45° angle relative to the holes in adjacent sets (although the lower holes 16, 16'; 16", 16"' in the example are shown displaced 90° in relation to the holes 17, 17' respectively in line with said holes).

When steam rushes down through the tube under increased pressure, e.g. within the range of 1–4 bar, the lower edge 14 in connection with each individual slot hole acts as a steam flow cutting edge which separates a part flow from the main steam flow and brings out said part flow to the surrounding water in the pool before the main flow reaches the bottom opening 12 of the tube. By the fact that the steam in this way is divided into a number of smaller part flows, the powerful pressure shock arising when one single main flow is to pass out in the water through the lower bottom opening, is mitigated or reduced. Therefore, a larger quantity of steam may, during a given unit of time, be brought out into the water in a smoother way than when one single main flow is to be fed out. When the surrounding water in the pool in a second phase tends to rise in the blow out tube as a consequence of increased water pressure and decreased steam pressure in the tube, the water may flow into the blow down tube not only through the central bottom opening 12, but also through the described slot holes. In this case, the water flows in through the slot holes in the shape of jets and reduces, in addition, process-disturbing contraction and separation in the vicinity of the bottom opening.

In FIG. 5 it is indicated how a tube made with a slot hole according to the invention may be supplemented by a circumfering, cross-section-wise arc-shaped flange 19 of a type known per se. Said flange contributes to facilitate the flows of steam and water respectively through the bottom opening.

The invention is not solely restricted to the embodiment described and shown in the drawing. Thus, it is conceivable to form a bent portion in connection with the upper edge 13 delimiting the individual slot hole, said portion bending outwards from the tube wall. Such a portion bending outwards may either act alone or in combination with a portion bending inwards in connection with the lower hole edge 14 as has been shown in the drawing.

I claim:

1. Steam blowing assembly for nuclear power plants, comprising a plurality of tubes (10), open at the top and at the bottom, hanging in connection with a reactor (2), the lower ends of which tubes are immersed in a water pool (6) and the purpose of which is to permit the blow down of steam into the water of the pool with the purpose of condensing the same so as to counteract the build-up of damaging steam overpressure in the containment of the reactor, characterized in that a number of through holes (16, 17, 18) are recessed in the wall (11) of the individual blow down tube (10), each one of said holes being delimited by upper and lower edges (13, 14) of which at least one (14) constitutes part of a portion (15) bent in relation to the tube wall (14), the lower hole edge (14) forming a steam flow cutting edge which, when the steam rushes down through the tube, divides a part flow from the main steam flow and brings said part flow out into the surrounding water of the pool before the main flow reaches the bottom opening (12) of the tube, and said hole permitting feed of water to the tube in a phase when the water strives to flow up in said hole.

2. Steam blowing assembly according to claim 1, characterized in that the bent tube wall portion (15) is made in connection with the lower hole edge (14) and extends inwards from the tube wall (11) as such.

3. Steam blowing assembly according to claim 1, characterized in that said bent portion (15) is made integrally with the tube wall (11) as such, more precisely through plastic deformation thereof.

4. Steam blowing assembly according to claim 1 characterized in that the hole is in the shape of a slot inasmuch as said upper and lower edges (13, 14) are situated approximately in one and the same horizontal plane, i.e. without any marked level difference between the edges.

5. Steam blowing assembly according to claim 1, characterized in that the hole or slot has an arc length along the tube wall corresponding to an arc angle within the range of 15–60°, suitably 30–45°.

6. Steam blowing assembly according to claim 1, characterized in that the holes are arranged in two or more sets separated axially along the tube, each one of which comprising two, suitably identical holes (16, 16', 17, 17'), which are mutually diametrically opposite.

7. Steam blowing assembly according to claim 6, characterized in that the pairs of holes in adjacent sets of holes along the tube are rotationally displaced, e.g. 90°, relative to each other.

8. Steam blowing assembly according to claim 2, characterized in that said bent portion (15) is made integrally with the tube wall (11) as such, more precisely through plastic deformation thereof.

9. Steam blowing assembly according to claim 2, characterized in that the hole is in the shape of a slot inasmuch as said upper and lower edges (13, 14) are situated approximately in one and the same horizontal plane, i.e. without any marked level difference between the edges.

10. Steam blowing assembly according to claim 3, characterized in that the hole is in the shape of a slot inasmuch as said upper and lower edges (13, 14) are situated approximately in one and the same horizontal plane, i.e. without any marked level difference between the edges.

11. Steam blowing assembly according to claim 8, characterized in that the hole is in the shape of a slot inasmuch as said upper and lower edges (13, 14) are situated approximately in one and the same horizontal plane, i.e. without any marked level difference between the edges.

12. Steam blowing assembly according to claim 2, characterized in that the hole or slot has an arc length along the tube wall corresponding to an arc angle within the range of 15–60°, suitably 30–45°.

13. Steam blowing assembly according to claim 3, characterized in that the hole or slot has an arc length along the tube wall corresponding to an arc angle within the range of 15–60°, suitably 30–45°.

14. Steam blowing assembly according to claim 4, characterized in that the hole or slot has an arc length along the tube wall corresponding to an arc angle within the range of 15–60°, suitably 30–45°.

15. Steam blowing assembly according to claim 2, characterized in that the holes are arranged in two or more sets separated axially along the tube, each one of which comprising two, suitably identical holes (16, 16', 17, 17'), which are mutually diametrically opposite.

16. Steam blowing assembly according to claim 3, characterized in that the holes are arranged in two or more sets separated axially along the tube, each one of which comprising two, suitably identical holes (16, 16', 17, 17'), which are mutually diametrically opposite.

17. Steam blowing assembly according to claim 4, characterized in that the holes are arranged in two or more sets separated axially along the tube, each one of which comprising two, suitably identical holes (16, 16', 17, 17'), which are mutually diametrically opposite.

18. Steam blowing assembly according to claim 5, characterized in that the holes are arranged in two or more sets separated axially along the tube, each one of which comprising two, suitably identical holes (16, 16', 17, 17'), which are mutually diametrically opposite.

19. Steam blowing assembly according to claim 15, characterized in that the pairs of holes in adjacent sets of holes along the tube are rotationally displaced, e.g. 90°, relative to each other.

20. Steam blowing assembly according to claim 16, characterized in that the pairs of holes in adjacent sets of holes along the tube are rotationally displaced, e.g. 90°, relative to each other.

* * * * *